(12) United States Patent
Takeuchi

(10) Patent No.: US 9,483,673 B2
(45) Date of Patent: Nov. 1, 2016

(54) NON-CONTACT COMMUNICATION MODULE AND CARD READER

(71) Applicant: NIDEC SANKYO CORPORATION, Suwa-gun, Nagano (JP)

(72) Inventor: Junro Takeuchi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 14/527,213

(22) Filed: Oct. 29, 2014

(65) Prior Publication Data

US 2015/0122884 A1    May 7, 2015

(30) Foreign Application Priority Data

Oct. 30, 2013    (JP) ................. 2013-224861

(51) Int. Cl.
*G06K 19/06* (2006.01)
*G06K 7/10* (2006.01)
*H01Q 1/22* (2006.01)
*H01Q 7/00* (2006.01)

(52) U.S. Cl.
CPC ........ *G06K 7/10336* (2013.01); *H01Q 1/2216* (2013.01); *G06K 7/10316* (2013.01); *H01Q 7/00* (2013.01)

(58) Field of Classification Search
USPC .......................................... 235/492
See application file for complete search history.

(56) References Cited

U.S. PATENT DOCUMENTS

2014/0239077 A1\* 8/2014 Ikeda ............... G06K 19/07749
                                                  235/492

FOREIGN PATENT DOCUMENTS

JP    2012-147190 A    8/2012

\* cited by examiner

*Primary Examiner* — Jamara Franklin
(74) *Attorney, Agent, or Firm* — Cantor Colburn LLP

(57) ABSTRACT

A non-contact communication module may include a substrate including an antenna including an antenna coil placed annularly in the substrate, and a ground pattern for grounding formed in the substrate; an antenna-side land that is formed on an external surface of the substrate, and is electrically connected to the antenna; and a ground-side land that is formed on the external surface of the substrate, and is electrically connected to the ground pattern. A distance between the antenna-side land and the ground-side land may be such that the antenna-side land and the ground-side land can be connected by use of a solder bridge.

9 Claims, 2 Drawing Sheets

NON-CONTACT COMMUNICATION MODULE AND CARD READER

CROSS REFERENCE TO RELATED APPLICATION

The present invention claims priority under 35 U.S.C. §119 to Japanese Application No. 2013-224861 filed Oct. 30, 2013, the entire contents of which are incorporated herein by reference.

FIELD OF THE INVENTION

The present invention relates to a non-contact communication module for communicating information with a non-contact IC card in a non-contact manner by way of electromagnetic induction, and a card reader provided with the non-contact communication module.

BACKGROUND

Conventionally, widely known is a communication module for communicating information with a medium, in which information is recorded, in a non-contact manner (for example, refer to Patent Document 1). A communication module described in Patent Document 1 is equipped with an IC for communication processing (communication processing IC) and an antenna. The communication processing IC and the antenna are connected each other by way of a low-pass filter and a matching circuit. The communication processing IC, the low-pass filter, and the matching circuit are mounted on a wiring substrate. The matching circuit is a circuit for adjusting characteristics of the antenna, and the matching circuit is provided with an electronic component embedded in the wiring substrate and an electronic component mounted on an external surface of the wiring substrate. In the case of the communication module described in Patent Document 1, the characteristics of the antenna are adjusted by way of mounting an electronic component having a predetermined constant, onto the external surface of the wiring substrate.

PATENT DOCUMENT

Patent Document 1; Japanese Unexamined Patent Application Publication No. 2012-147190

In the case of the communication module described in Patent Document 1, the characteristics of the antenna are adjusted by way of mounting an electronic component having a predetermined constant, onto the external surface of the wiring substrate. Therefore, in the case where the characteristics of the antenna are adjusted after assembling work of the communication module has already finished, it is needed to replace the electronic component mounted on the external surface of the wiring substrate. Accordingly, in the case of the communication module described in Patent Document 1, if once the assembling work of the communication module has finished, a subsequent adjustment of the characteristics of the antenna becomes complicated. Incidentally, among various communication modules, there also exists a communication module provided with a trimming device such as an electronic volume; and in the case of that communication module, even after completion of the communication module, adjusting the trimming device makes it possible to adjust the characteristics of the antenna. Unfortunately, on the other hand; in the case of that communication module, it is needed to evaluate and control the communication module after adjusting the trimming device, by use of a measuring instrument for checking whether or not the antenna is set in such a way as to have expected characteristics. Moreover, in the case of that communication module, an additional step, such as, locking the trimming device with an adhesive is required in order to make the trimming device immovable. Therefore, in the case of that communication module as well, if once the assembling work of the communication module has finished, a subsequent adjustment of the characteristics of the antenna becomes complicated.

SUMMARY

Then, it is at least an embodiment of the present invention provides a non-contact communication module that can easily choose characteristics of an antenna for adjustment, even after completion of assembling work of the non-contact_communication module. Furthermore, at least an embodiment of the present invention provides a card reader provided with such a non-contact communication module.

To bring a solution for the subject described above, a non-contact communication module according to at least an embodiment of the present invention is a non-contact communication module for communicating information with a non-contact IC card in a non-contact manner by way of electromagnetic induction, including: a substrate in which an antenna including an antenna coil placed annularly, and a ground pattern for grounding are formed; an antenna-side land that is formed on an external surface of the substrate, and electrically connected to the antenna; and a ground-side land that is formed on the external surface of the substrate, and electrically connected to the ground pattern; wherein a distance between the antenna-side land and the ground-side land is so made as to be a distance with which the antenna-side land and the ground-side land can be connected by use of a solder bridge.

In the non-contact communication module according to at least an embodiment of the present invention, the antenna-side land electrically connected to the antenna and the ground-side land electrically connected to the ground pattern are formed on the external surface of the substrate; and then, the distance between the antenna-side land and the ground-side land is so made as to be a distance with which the antenna-side land and the ground-side land can be connected by use of a solder bridge. Therefore, according to at least an embodiment of the present invention, even after completion of assembling work of the non-contact communication module, the antenna-side land and the ground-side land can easily be connected by use of the solder bridge. Then, connecting the antenna-side land and the ground-side land by use of the solder bridge changes impedance and parasitic capacitance of the antenna, and therefore different characteristics of the antenna can be chosen. Accordingly, even after completion of assembling work of the non-contact communication module, it becomes possible according to at least an embodiment of the present invention to easily choose characteristics of the antenna for adjustment. As a result, the characteristics of the antenna can easily be adjusted, in accordance with actual installation environments of the non-contact communication module, and characteristics and the like of the non-contact IC card with which communication is conducted in reality.

Moreover, to bring a solution for the subject described above, a non-contact communication module according to at least an embodiment of the present invention is a non-contact communication module for communicating information with a non-contact IC card in a non-contact manner by way of electromagnetic induction, including: a substrate in which an antenna including an antenna coil placed annularly, a shield pattern so placed as to cover the antenna, and a ground pattern for grounding are formed; a shield-side land that is formed on an external surface of the substrate, and electrically connected to the shield pattern; and a ground-side land that is formed on the external surface of the substrate, and electrically connected to the ground pattern; wherein a distance between the shield-side land and the ground-side land is so made as to be a distance with which the shield-side land and the ground-side land can be connected by use of a solder bridge.

In the non-contact communication module according to at least an embodiment of the present invention, the shield-side land electrically connected to the shield pattern covering the antenna and the ground-side land electrically connected to the ground pattern are formed on the external surface of the substrate; and then, the distance between the shield-side land and the ground-side land is so made as to be a distance with which the shield-side land and the ground-side land can be connected by use of a solder bridge. Therefore, according to at least an embodiment of the present invention, even after completion of assembling work of the non-contact communication module, the shield-side land and the ground-side land can easily be connected by use of the solder bridge. Then, connecting the shield-side land and the ground-side land by use of the solder bridge changes a level of electromagnetic coupling of the antenna and the non-contact IC card, as well as parasitic capacitance of the antenna including the shield pattern, and therefore different characteristics of the antenna can be chosen. Accordingly, even after completion of assembling work of the non-contact communication module, it becomes possible according to at least an embodiment of the present invention to easily choose characteristics of the antenna for adjustment. As a result, the characteristics of the antenna can easily be adjusted, in accordance with actual installation environments of the non-contact communication module, and characteristics and the like of the non-contact IC card with which communication is conducted in reality.

Moreover, to bring a solution for the subject described above, a non-contact communication module according to at least an embodiment of the present invention is a non-contact communication module for communicating information with a non-contact IC card in a non-contact manner by way of electromagnetic induction, including: a substrate in which an antenna including an antenna coil placed annularly, a shield pattern so placed as to cover the antenna, and a ground pattern for grounding are formed; an antenna-side land that is formed on an external surface of the substrate, and electrically connected to the antenna; and a shield-side land that is formed on the external surface of the substrate, and electrically connected to the shield pattern; and a first ground-side land and a second ground-side land that are formed on the external surface of the substrate, and electrically connected to the ground pattern; wherein a distance between the antenna-side land and the first ground-side land is so made as to be a distance with which the antenna-side land and the first ground-side land can be connected by use of a solder bridge; and a distance between the shield-side land and the second ground-side land is so made as to be a distance with which the shield-side land and the second ground-side land can be connected by use of a solder bridge.

In the non-contact communication module according to at least an embodiment of the present invention, the shield-side land electrically connected to the shield pattern covering the antenna, the antenna-side land electrically connected to the antenna, and the first ground-side land and the second ground-side land electrically connected to the ground pattern are formed on the external surface of the substrate. Then, according to at least an embodiment of the present invention, the distance between the antenna-side land and the first ground-side land is so made as to be a distance with which the antenna-side land and the first ground-side land can be connected by use of a solder bridge; and the distance between the shield-side land and the second ground-side land is so made as to be a distance with which the shield-side land and the second ground-side land can be connected by use of a solder bridge. Therefore, according to at least an embodiment of the present invention, even after completion of assembling work of the non-contact communication module, the antenna-side land and the first ground-side land can easily be connected by use of the solder bridge, and the shield-side land and the second ground-side land can easily be connected by use of the solder bridge. Then, connecting the antenna-side land and the first ground-side land by use of the solder bridge changes impedance and parasitic capacitance of the antenna, and therefore different characteristics of the antenna can be chosen. Moreover, connecting the shield-side land and the second ground-side land by use of the solder bridge changes a level of electromagnetic coupling of the antenna and the non-contact IC card, as well as parasitic capacitance of the antenna including the shield pattern, and therefore different characteristics of the antenna can be chosen. Accordingly, even after completion of assembling work of the non-contact communication module, it becomes possible according to at least an embodiment of the present invention to easily choose characteristics of the antenna for adjustment. As a result, the characteristics of the antenna can easily be adjusted, in accordance with actual installation environments of the non-contact communication module, and characteristics and the like of the non-contact IC card with which communication is conducted in reality.

In at least an embodiment of the present invention, it is preferable that the antenna-side land is electrically connected to a terminal end of the antenna coil. According to this configuration, even when the antenna-side land and the ground-side land are connected by use of the solder bridge, an electric current can flow for sure up to the terminal end of the antenna coil.

In at least an embodiment of the present invention, it is preferable that, for example, a first antenna including a first antenna coil as the antenna coil, and a second antenna including a second antenna coil as the antenna coil, are formed as the antenna in the substrate; a terminal end of the first antenna coil and a terminal end of the second antenna coil are connected each other; and the antenna-side land is electrically connected to a connection point that connects the terminal end of the first antenna coil and the terminal end of the second antenna coil. In this case, even when the antenna-side land and the ground-side land are connected by use of the solder bridge, an electric current can flow for sure up to the terminal end of the first antenna coil and the terminal end of the second antenna coil.

In at least an embodiment of the present invention, it is preferable that, for example, the substrate is a multi-layer board having an antenna layer where the antenna is formed, and a shield ground layer where the shield pattern and the ground pattern are formed.

The non-contact communication module according to at least an embodiment of the present invention can be used for a card reader including a main body in which the non-contact communication module is to be installed. In the card reader, it becomes possible to easily choose characteristics of the antenna for adjustment, even after completion of assembling work of the non-contact communication module.

As described above, in the case of the non-contact communication module and the card reader according to at least an embodiment of the present invention, it becomes possible to easily choose characteristics of the antenna for adjustment, even after completion of the assembling work of the non-contact communication module.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE PREFERRED EMBODIMENTS

An embodiment of the present invention is described below with reference to the accompanying drawings.
(Configuration of a Non-Contact Communication Module)

Figure 1:
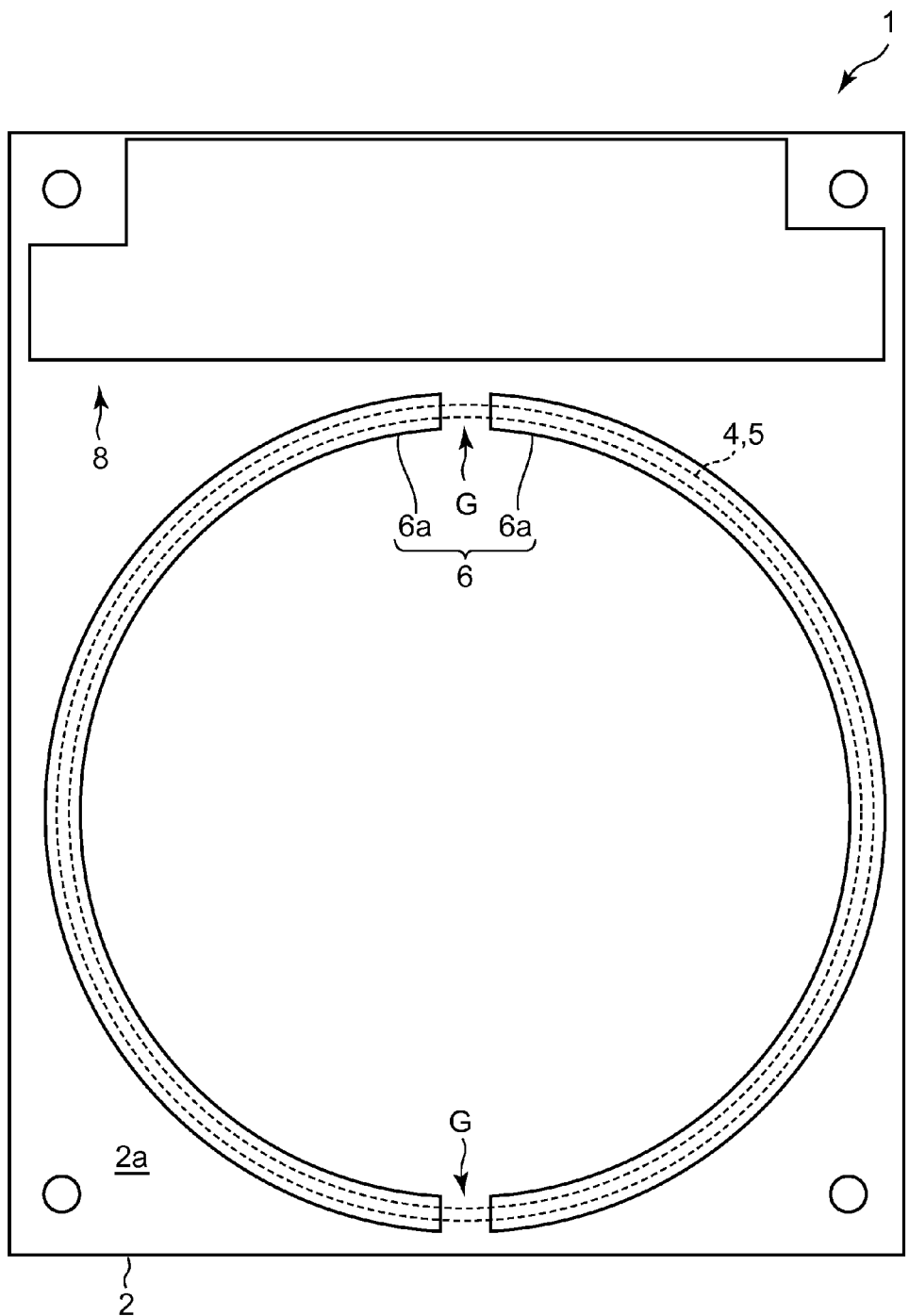
FIG. 1 is a diagram that shows a front side of a non-contact communication module according to an embodiment of the present invention.
Figure 2:
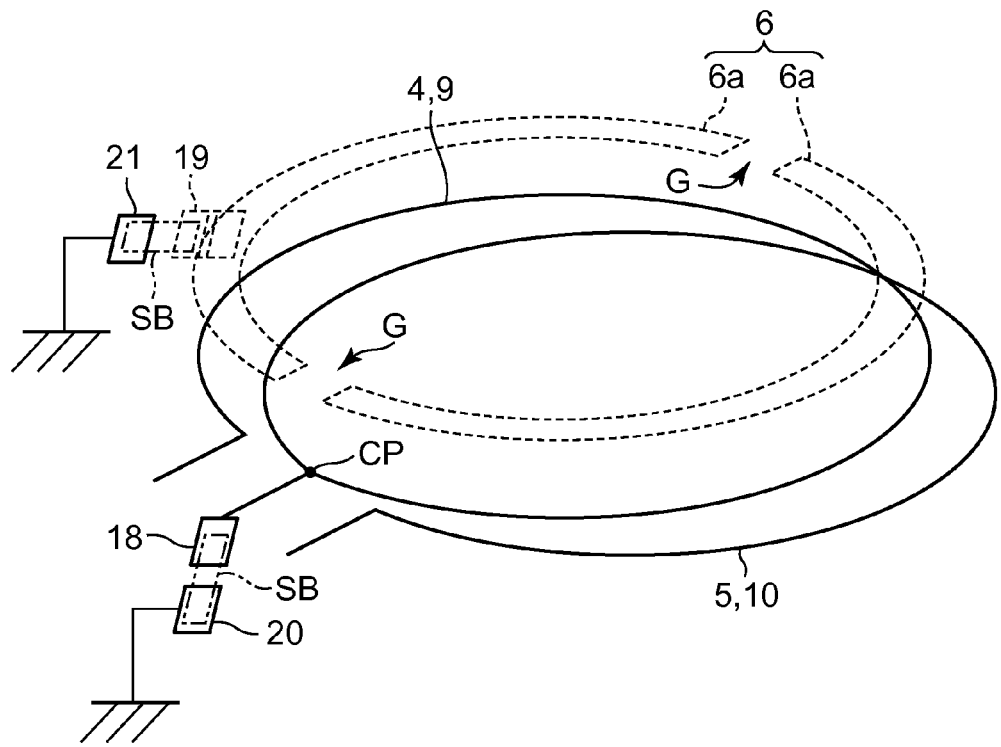
FIG. 2 is a schematic view for explaining a configuration of the non-contact communication module shown in FIG. 1.
Figure 3:
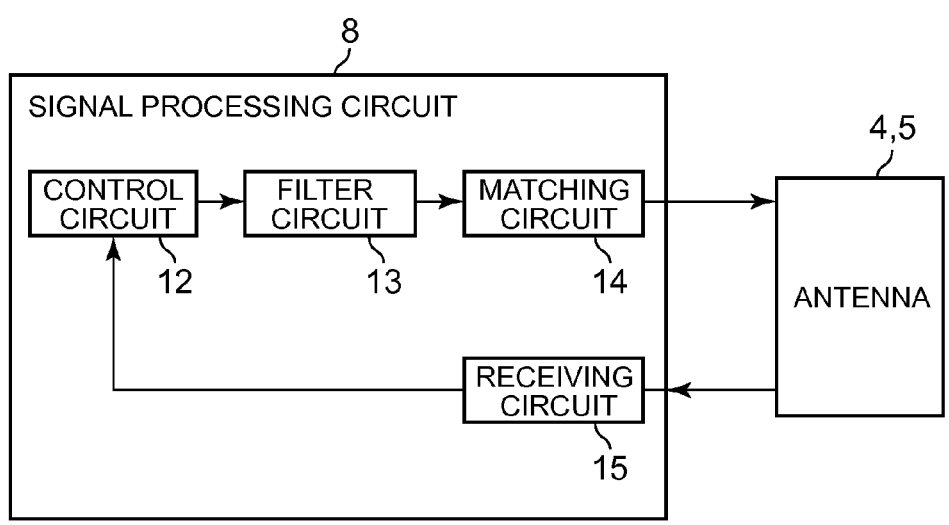
FIG. 3 is a block diagram for explaining the configuration of the non-contact communication module shown in FIG. 1.

FIG. 1 is a diagram that shows a front side of a non-contact communication module 1 according to an embodiment of the present invention. FIG. 2 is a schematic view for explaining a configuration of the non-contact communication module 1 shown in FIG. 1. FIG. 3 is a block diagram for explaining the configuration of the non-contact communication module 1 shown in FIG. 1.

The non-contact communication module 1 of the present embodiment is a module for communicating information with a non-contact IC card (not illustrated) in a non-contact manner by way of electromagnetic induction. The non-contact communication module 1 is used, being installed in a card reader (not illustrated). The card reader is provided with a main body in which the non-contact communication module 1 is installed. Moreover, the card reader is used; for example, being mounted in a predetermined higher-level device, such as an ATM (Automated Teller Machine).

The non-contact communication module 1 includes a substrate 2. The substrate 2 is a rigid substrate, such as a glass epoxy substrate, which is formed to be an approximately rectangular plate. The non-contact communication module 1 is installed in the main body of the card reader in such a way that a surface of a front side (front-side surface) 2a of the substrate 2 faces a non-contact IC card which the card reader deals with.

In the substrate 2, there are formed an antenna 4 and an antenna 5 for communicating information with the non-contact IC card, and supplying the non-contact IC card with electricity; a shield pattern 6 that is so placed as to cover the antenna 4 and the antenna 5; and a ground pattern for grounding. Moreover, a signal processing circuit 8 is implemented in the substrate 2. The ground pattern is formed, for example, at a part where the signal processing circuit 8 of the substrate 2 is implemented.

Incidentally, the substrate 2 is a multi-layer board in which a plurality of conductor layers and insulator layers are stacked alternately. Concretely to describe, the substrate 2 is a four-layer board; in which there are a shield ground layer where the shield pattern 6 and the ground pattern are formed, an antenna layer (a first antenna layer) where the antenna 4 is formed, a dummy layer where a circuit pattern is not formed, and another antenna layer (a second antenna layer) where the antenna 5 is formed, and the insulator layers, each of which is placed between two neighboring layers of the above four layers, wherein each of the above four layers and each of the insulator layers are stacked alternately. The shield ground layer, the first antenna layer, the dummy layer, and the second antenna layer are placed in this order from the front-side surface 2a toward a rear-side surface.

The antenna 4 includes an antenna coil 9 placed annularly, and in the meantime, the antenna 5 includes an antenna coil 10 placed annularly. In other words, the antenna 4 and the antenna 5 are so formed as to be annular. A terminal end of the antenna coil 9 and a terminal end of the antenna coil 10 are connected each other. In the present embodiment, the antenna 4 is a first antenna, and the antenna 5 is a second antenna; and in the meantime, the antenna coil 9 is a first antenna coil, and the antenna coil 10 is a second antenna coil.

The shield pattern 6 is so formed as to be almost annular in such a way as to cover almost an entire section of the antenna 4 and the antenna 5, on the front-side surface 2a of the substrate 2. The shield pattern 6 includes two shield pattern parts 6a, for example, formed to be almost semi-circular, wherein the two shield pattern parts 6a are so formed as to have a gap between two end parts of the two shield pattern parts 6a in their circular direction. In other words, a gap 'G' is formed at each of two positions in the circular direction of the shield pattern 6. Therefore, an electric current generated in the shield pattern 6 by way of electromagnetic induction never flows in such a way as to circulate through the shield pattern 6. Incidentally, the gap 'G' may be placed at one location, or three or more locations in the circular direction of the shield pattern 6.

The signal processing circuit 8 is provided with a control circuit 12 including an integrated circuit. To the control circuit 12, one end of the antennas 4 and 5 is connected by the intermediary of a filter circuit 13 and a matching circuit 14, and meanwhile the other end of the antennas 4 and 5 is connected by the intermediary of a receiving circuit 15. The filter circuit 13 is a low-pass filter. The matching circuit 14 and the receiving circuit 15 serve a function in initially setting characteristics of the antennas 4 and 5.

On either the front-side surface 2a or the rear-side surface of the substrate 2 (namely, external surfaces of the substrate 2), there are formed an antenna-side land 18 electrically connected to the antennas 4 and 5, a shield-side land 19 electrically connected to the shield pattern 6, and ground-side lands 20 and 21 electrically connected to the ground pattern. The antenna-side land 18 is electrically connected to the terminal ends of the antenna coil 9 and the antenna coil 10. In other words, the antenna-side land 18 is electrically connected to a connection point CP that connects the terminal end of the antenna coil 9 and the terminal end of the antenna coil 10. Meanwhile, the shield-side land 19 is electrically connected to, for example, an arbitrary position in either shield pattern part 6a of the two shield pattern parts 6a.

A distance between the antenna-side land 18 and the ground-side land 20 is so made as to be a distance with which the antenna-side land 18 and the ground-side land 20 can be connected by use of a solder bridge SB. In the meantime, a distance between the shield-side land 19 and the ground-side land 21 is so made as to be a distance with which the shield-side land 19 and the ground-side land 21 can be connected by use of a solder bridge SB. In the present embodiment, the ground-side land 20 is a first ground-side land, and meanwhile the ground-side land 21 is a second ground-side land.

In the non-contact communication module 1 configured as described above, the antenna-side land 18 and the ground-side land 20 are either connected by use of the solder bridge SB, or not connected, in accordance with needed characteristics of the antennas 4 and 5. In the meantime, the shield-side land 19 and the ground-side land 21 are connected by use of the solder bridge SB, or not connected, in accordance with needed characteristics of the antennas 4 and 5. For example, in the case where a communication is conducted between the non-contact IC card and the non-contact communication module 1 under conditions where a certain clearance is given between the non-contact IC card and the antennas 4 and 5, the shield-side land 19 and the ground-side land 21 are not connected. On the other hand, in the case where a communication is conducted between the non-contact IC card and the non-contact communication module 1 under conditions where the non-contact IC card and the antennas 4 and 5 firmly contact each other, the shield-side land 19 and the ground-side land 21 are connected by use of the solder bridge SB.

(Primary Advantageous Effect of the Present Embodiment)

As explained above, in the present embodiment, the antenna-side land 18 electrically connected to the antennas 4 and 5, the shield-side land 19 electrically connected to the shield pattern 6, and the ground-side lands 20 and 21 electrically connected to the ground pattern are formed on the external surfaces of the substrate 2. Moreover, in the present embodiment, the distance between the antenna-side land 18 and the ground-side land 20 is so made as to be a distance with which the antenna-side land 18 and the ground-side land 20 can be connected by use of a solder bridge SB, and meanwhile, the distance between the shield-side land 19 and the ground-side land 21 is so made as to be a distance with which the shield-side land 19 and the ground-side land 21 can be connected by use of a solder bridge SB.

Therefore, in the present embodiment, even after completion of assembling work of the non-contact communication module 1, it becomes possible to easily connect the antenna-side land 18 and the ground-side land 20 by use of the solder bridge SB, and also to easily connect the shield-side land 19 and the ground-side land 21 by use of the solder bridge SB. Then, connecting the antenna-side land 18 and the ground-side land 20 by use of the solder bridge SB changes impedance and parasitic capacitance of the antennas 4 and 5, and therefore different characteristics of the antennas 4 and 5 can be chosen. Moreover, connecting the shield-side land 19 and the ground-side land 21 by use of the solder bridge SB changes a level of electromagnetic coupling of the antennas 4 and 5 and the non-contact IC card, as well as parasitic capacitance of the antennas 4 and 5 including the shield pattern 6, and therefore different characteristics of the antennas 4 and 5 can be chosen. Accordingly, in the present embodiment, even after completion of assembling work of the non-contact communication module 1, it becomes possible to easily choose characteristics of the antennas 4 and 5 for adjustment. As a result, in the present embodiment, the characteristics of the antennas 4 and 5 can easily be adjusted, in accordance with actual installation environments of the non-contact communication module 1, and characteristics and the like of the actual non-contact IC card to be processed by the card reader.

In the present embodiment, the antenna-side land 18 is electrically connected to the connection point CP that connects the terminal end of the antenna coil 9 and the terminal end of the antenna coil 10. Therefore, in the present embodiment, even when the antenna-side land 18 and the ground-side land 20 are connected by use of the solder bridge SB, an electric current can flow for sure up to the terminal ends of the antenna coils 9 and 10.

Incidentally, in the case where the antenna-side land 18 and the ground-side land 20 are connected by use of the solder bridge SB, heat generated at the antennas 4 and 5 can be radiated effectively by using the ground pattern. In the meantime, in the case where the shield-side land 19 and the ground-side land 21 are connected by use of the solder bridge SB, heat generated at the signal processing circuit 8, in which the ground pattern is formed, can be radiated effectively by using the shield pattern 6.

Other Embodiments

Described above is an example of a preferred embodiment according to the present invention. However, the present invention is not limited to the above embodiment and various variations and modifications may be made without changing the concept of the present invention.

In the embodiment described above, the shield pattern 6 is formed in the substrate 2. Alternatively, the shield pattern 6 may not be formed in the substrate 2. In this case, the shield-side land 19 and the ground-side land 21 are not necessary. Even in this case, after completion of assembling work of the non-contact communication module 1, it becomes possible to easily connect the antenna-side land 18 and the ground-side land 20 by use of the solder bridge SB. Then, connecting the antenna-side land 18 and the ground-side land 20 by use of the solder bridge SB changes impedance and parasitic capacitance of the antennas 4 and 5, and therefore different characteristics of the antennas 4 and 5 can be chosen. Accordingly, even after completion of assembling work of the non-contact communication module 1, it becomes possible to easily choose characteristics of the antennas 4 and 5 for adjustment.

In the embodiment described above, the antenna-side land 18 is formed on the external surfaces of the substrate 2. Alternatively, the antenna-side land 18 may not be formed on the external surfaces of the substrate 2. In this case, the ground-side land 20 is not necessary. Even in this case, after completion of assembling work of the non-contact communication module 1, it becomes possible to easily connect the shield-side land 19 and the ground-side land 21 by use of the solder bridge SB. Then, connecting the shield-side land 19 and the ground-side land 21 by use of the solder bridge SB changes a level of electromagnetic coupling of the antennas 4 and 5 and the non-contact IC card, as well as parasitic capacitance of the antennas 4 and 5 including the shield pattern 6, and therefore different characteristics of the antennas 4 and 5 can be chosen. Accordingly, even after completion of assembling work of the non-contact communication module 1, it becomes possible to easily choose characteristics of the antennas 4 and 5 for adjustment.

In the embodiment described above, the substrate 2 is a four-layer board. Alternatively, the substrate 2 may be a double-sided board or a three-layer board, or any multi-layer board having five or more layers. Furthermore, in the embodiment described above, the antennas 4 and 5 are so formed as to be annular. Alternatively, the antennas 4 and 5 may be so formed as to be a poly-angular ring such as a square ring, a hexagonal ring and the like, or may be so formed as to be an ellipsoidal ring. Even in these cases, the shield pattern 6 is formed in such a way as to cover the antennas 4 and 5. Incidentally, anyhow a gap is formed at one location or more in a circular direction of the shield pattern 6, in such a way that an electric current generated in the shield pattern 6 by way of electromagnetic induction does not flow so as to circulate through the shield pattern 6.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A non-contact communication module for communicating information with a non-contact IC card in a non-contact manner by way of electromagnetic induction, comprising:
    a substrate in which an antenna including an antenna coil placed annularly, and a ground pattern for grounding are formed;
    an antenna-side land that is formed on an external surface of the substrate, and electrically connected to the antenna; and
    a ground-side land that is formed on the external surface of the substrate, and electrically connected to the ground pattern;
    wherein a distance between the antenna-side land and the ground-side land is so made as to be a distance with which the antenna-side land and the ground-side land is connected by use of a solder bridge.

2. The non-contact communication module according to claim 1;
    wherein the antenna-side land is electrically connected to a terminal end of the antenna coil.

3. The non-contact communication module according to claim 2;
    wherein, a first antenna including a first antenna coil as the antenna coil, and a second antenna including a second antenna coil as the antenna coil, are formed as the antenna in the substrate;
    a terminal end of the first antenna coil and a terminal end of the second antenna coil are connected each other; and
    the antenna-side land is electrically connected to a connection point that connects the terminal end of the first antenna coil and the terminal end of the second antenna coil.

4. A non-contact communication module for communicating information with a non-contact IC card in a non-contact manner by way of electromagnetic induction, comprising:
    a substrate in which an antenna including an antenna coil placed annularly, a shield pattern so placed as to cover the antenna, and a ground pattern for grounding are formed;
    a shield-side land that is formed on an external surface of the substrate, and electrically connected to the shield pattern; and
    a ground-side land that is formed on the external surface of the substrate, and electrically connected to the ground pattern;
    wherein a distance between the shield-side land and the ground-side land is so made as to be a distance with which the shield-side land and the ground-side land is connected by use of a solder bridge.

5. The non-contact communication module according to claim 4;
    wherein the substrate is a multi-layer board having an antenna layer where the antenna is formed, and a shield ground layer where the shield pattern and the ground pattern are formed.

6. A non-contact communication module for communicating information with a non-contact IC card in a non-contact manner by way of electromagnetic induction, comprising:
    a substrate in which an antenna including an antenna coil placed annularly, a shield pattern so placed as to cover the antenna, and a ground pattern for grounding are formed;
    an antenna-side land that is formed on an external surface of the substrate, and electrically connected to the antenna; and
    a shield-side land that is formed on the external surface of the substrate, and electrically connected to the shield pattern; and
    a first ground-side land and a second ground-side land that are formed on the external surface of the substrate, and electrically connected to the ground pattern;
    wherein a distance between the antenna-side land and the first ground-side land is so made as to be a distance with which the antenna-side land and the first ground-side land can beis connected by use of a solder bridge; and
    a distance between the shield-side land and the second ground-side land is so made as to be a distance with which the shield-side land and the second ground-side land is connected by use of a solder bridge.

7. The non-contact communication module according to claim 6;
    wherein the antenna-side land is electrically connected to a terminal end of the antenna coil.

8. The non-contact communication module according to claim 6;
    wherein the substrate is a multi-layer board having an antenna layer where the antenna is formed, and a shield ground layer where the shield pattern and the ground pattern are formed.

9. The non-contact communication module according to claim 7;
    wherein, a first antenna including a first antenna coil as the antenna coil, and a second antenna including a second antenna coil as the antenna coil, are formed as the antenna in the substrate;
    a terminal end of the first antenna coil and a terminal end of the second antenna coil are connected each other; and
    the antenna-side land is electrically connected to a connection point that connects the terminal end of the first antenna coil and the terminal end of the second antenna coil.

* * * * *